July 2, 1929. K. C. BERGER Re. 17,345

LAMP SHADE FRAME CENTER ELEMENT

Original Filed Aug. 6, 1927

WITNESSES
A. J. Mank
Hugh N. Ott

INVENTOR
KORNEL C. BERGER
BY
Munn & Co.
ATTORNEY

Reissued July 2, 1929. Re. 17,345

UNITED STATES PATENT OFFICE.

KORNEL C. BERGER, OF BROOKLYN, NEW YORK.

LAMP-SHADE-FRAME CENTER ELEMENT.

Original No. 1,695,223, dated December 11, 1928, Serial No. 211,231, filed August 6, 1927. Application for reissue filed April 26, 1929. Serial No. 358,408.

This invention relates to lamp shade frames, and refers more particularly to an improved center element constituting means for mounting the lamp shade frame on a support or holder.

The present invention aims for its principal object to provide an improved center element for a lamp shade frame which is adapted to be incorporated in and to become a substantially integral part thereof so that a lasting and rigid connection between the shade frame and center element is obtained, without resorting to welding or soldering processes.

The invention more specifically contemplates a lamp shade frame center element which is spun, stamped or otherwise formed from sheet material to provide a hub defining a central opening and a section extending outwardly from said hub, which section is provided with an inwardly bent portion apertured at the bight to receive and grip therebetween the inner ends of the radial inwardly projecting arms or wires of the shade frame.

The invention furthermore resides in the improved means for anchoring the inner terminal of each arm or wire between the outwardly extending section of the center element and the inwardly bent portion of said section whereby to prevent radial displacement or relative movement between the element and arm in any direction.

Other objects reside in the comparative simplicity of construction of the device, the economy with which the same may be produced and the general efficiency derived therefrom.

With the above recited and other objects in view, reference is had to the following description and accompanying drawings, in which there is exhibited one example or embodiment of the invention, while the appended claims define the actual scope thereof.

Figure 1:
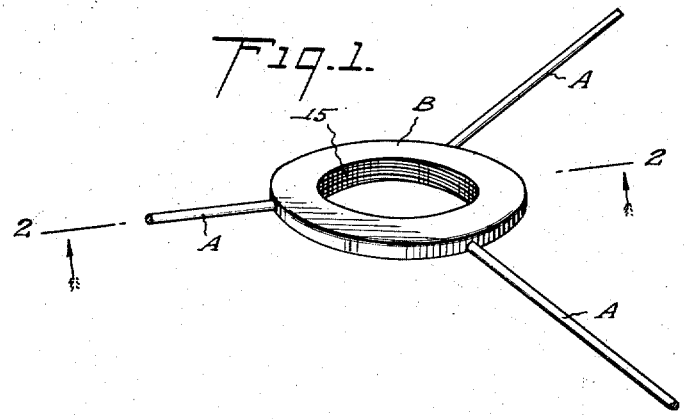
Figure 1 is a perspective view of the center element connected to the arms of a lamp shade frame.
Figure 2:
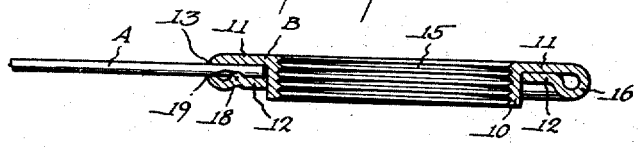
Figure 2 is a sectional view therethrough taken approximately on the line indicated at 2—2 in Figure 1.

Referring to the drawings by characters of reference, A designates the arms which project radially inward from a lamp shade frame, not shown, and B refers generally to the center element constituting the subject matter of the present invention, which element is designed to serve as a means for mounting a lamp shade frame on a suitable support such as the threaded end of the shell of an electric lamp socket or any other equivalent or holder.

The center element comprises a substantially cylindrical or tubular hub 10 having an outwardly projecting annular flange or section 11 at one of its ends, the said flange or section 11 having a portion 12 bent inwardly into a position substantially parallel to and underlying the flange. The structure described is spun, stamped or otherwise formed from sheet material and is provided at the juncture or connecting bight of the portion 12 with the section or flange 11, with the circumferentially spaced openings 13 corresponding in number to the number of arms A. The hub 10 may be internally threaded as at 15 to engage over the shell of an electric lamp socket, not shown, to afford means for connecting the shade frame with the socket.

The arms A extend through the circumferentially spaced openings 13 in abutting relation with the hub 10 and the flange portion 12 is bent inwardly by a suitable die, which die is provided with means to form a projection 18 on the inner surface of the flange portion 12 and at the same time to form a depression in each arm terminal within which the projection 18 is received for the purpose of preventing radial outward movement of the arms.

It thus follows that a center element has been devised which when incorporated in the shade frame forms a substantially integral and rigid part thereof so that a firm and lasting connection between the center element and the frame is obtained. It, therefore, follows that when the shade is properly mounted on a support, relative movement between the shade frame arms and the center element is precluded, and this without the necessity of welding, soldering or employing similar means of establishing a connection between the arms and the center element.

What is claimed is:

1. A center element for mounting a lamp shade frame on a support comprising a substantially cylindrical hub, a radially projecting U-shaped portion having an apertured bight, a radial arm extending through the apertured bight between the leaves of the U-shaped portion and an in-struck projection from one of the leaves recessed in the inner end of the arm for anchoring the same against radial outward and lateral relative movement with respect to the center element.

2. A center element for a lamp shade frame comprising a sheet metal member having a substantially cylindrical hub, an outwardly projecting section at one end thereof having an inwardly bent portion underlying said section, said section and portion at their juncture having an opening through which the lamp shade frame arm extends radially inward and means for anchoring the arm against radial outward and lateral movements comprising a recess in said arm and an inward projection of said portion engaging the recess of the arm.

3. A center element for a lamp shade frame comprising a hub defining a central opening and a section extending outwardly from said hub, said outwardly extending section having an inwardly bent portion apertured at its juncture with the section for receiving and gripping a lamp shade frame arm and an in-struck projection from said inwardly bent portion, recessed in the inner end of the arm whereby said arm is anchored against radial outward and lateral movements.

4. A center element for a lamp shade frame comprising an annular member defining a central opening and a portion bent inwardly from the outer periphery of said annular member, said portion being formed with an aperture at the juncture thereof with the annular member for receiving therethrough, the arm of the lamp shade, said inwardly bent portion having an in-struck projection recessed in the inner end of the arm whereby said arm is anchored against radial outward movement.

Signed at New York, in the county of New York and State of New York, this 24th day of April, A. D. 1929.

KORNEL C. BERGER.